US011432170B1

(12) United States Patent
Osinski et al.

(10) Patent No.: US 11,432,170 B1
(45) Date of Patent: Aug. 30, 2022

(54) PORTABLE GENERATOR DISPATCH RECOMMENDATION ENGINE

(71) Applicants: AT&T Intellectual Property I, L.P., Atlanta, GA (US); AT&T Mobility II LLC, Atlanta, GA (US)

(72) Inventors: Matthew Osinski, Westfield, NJ (US); Mark Brisbay, Snellville, GA (US); Zihui Ge, Madison, NJ (US); He Yan, Berkeley Heights, NJ (US); Shuai Hao, Hillsborough, NJ (US); Hector Perez, Dacula, GA (US); Gavin Anderson, Monument, CO (US); Jason Tipton, Oak Point, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/228,123

(22) Filed: Apr. 12, 2021

(51) Int. Cl.
*H04W 24/02* (2009.01)

(52) U.S. Cl.
CPC ................... *H04W 24/02* (2013.01)

(58) Field of Classification Search
None
See application file for complete search history.

(56) References Cited

U.S. PATENT DOCUMENTS

| 9,887,906 B2 * | 2/2018 | Rijnders | H04W 4/70 |
| 10,636,006 B2 | 4/2020 | Yan et al. | |
| 2014/0129272 A1 * | 5/2014 | Hanley | G06Q 50/06 705/7.13 |
| 2016/0080248 A1 * | 3/2016 | Rijnders | H04W 4/70 709/224 |
| 2019/0090145 A1 * | 3/2019 | Pelletier | H04L 41/0668 |

* cited by examiner

*Primary Examiner* — Kevin Kim
(74) *Attorney, Agent, or Firm* — Guntin & Gust, PLC; Ralph Trementozzi

(57) ABSTRACT

Aspects of the subject disclosure may include, for example, detecting an interruption of a supply of operating power to a cell site of a cellular communication network, estimating an estimated time to restoration (ETR) of the supply of operating power to the cell site, wherein the estimating is based on information of an operator of the cellular communication network, determining, based in part on the ETR, to dispatch a portable generator to the cell site to provide a new supply of operating power to the cell site, and initiating a communication to dispatch the portable generator. Other embodiments are disclosed.

20 Claims, 8 Drawing Sheets

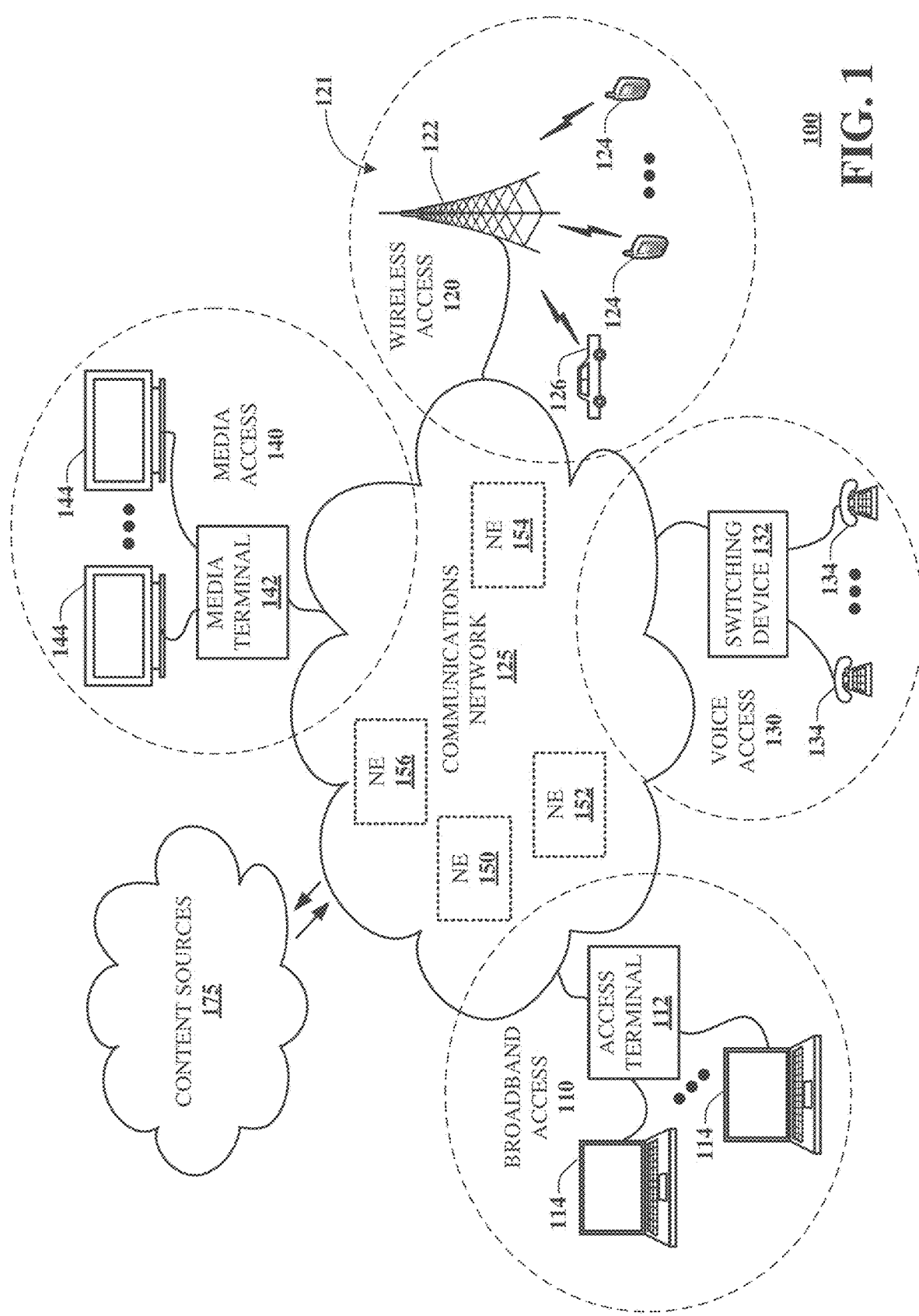

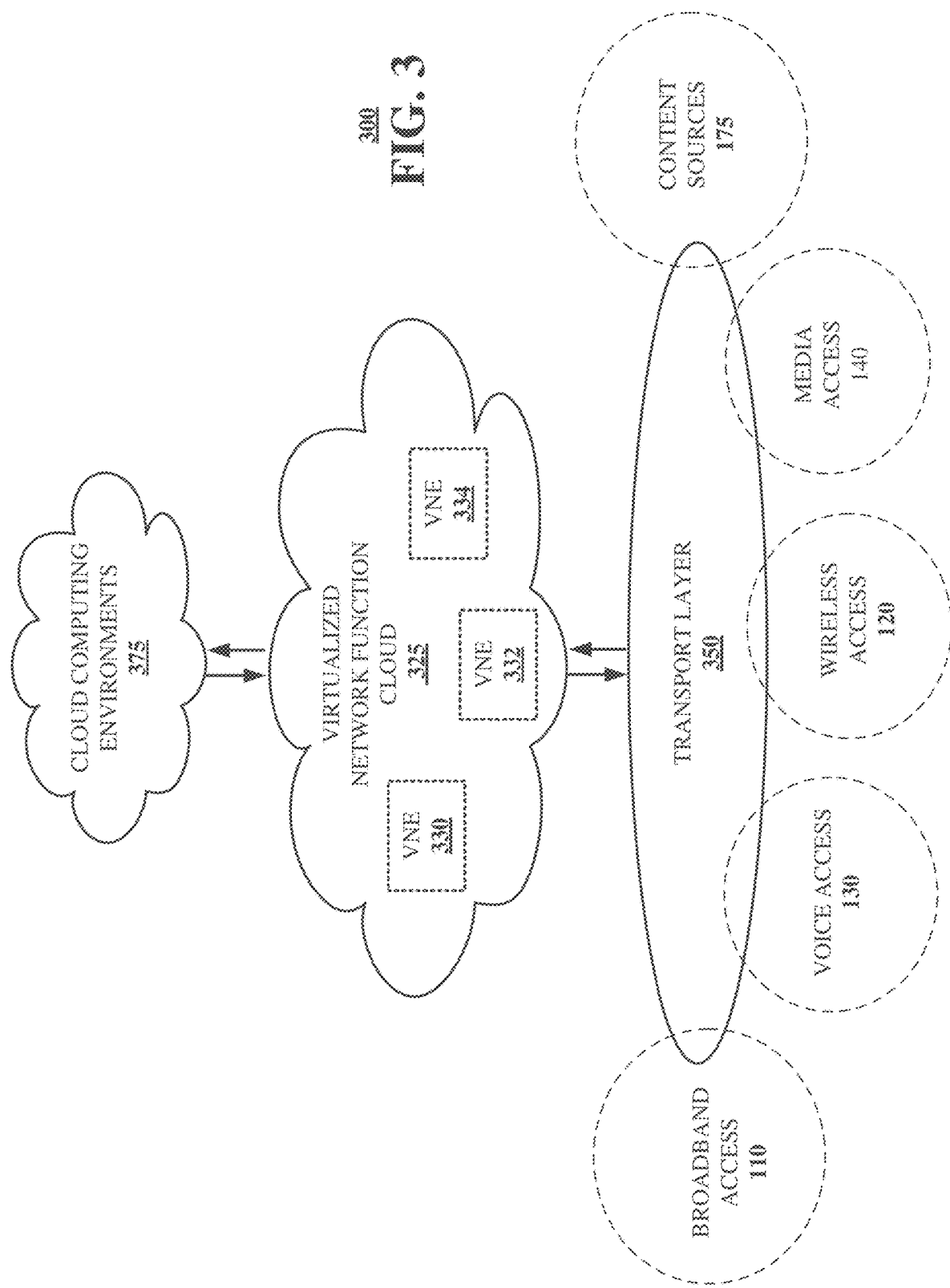

PORTABLE GENERATOR DISPATCH RECOMMENDATION ENGINE

FIELD OF THE DISCLOSURE

The subject disclosure relates to a portable generator dispatch recommendation engine for a telecommunications system and the like.

BACKGROUND

The rapid identification of the severity of a commercial power outage, as well as identifying an accurate time to repair, is critical for operators of system such as cellular networks.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
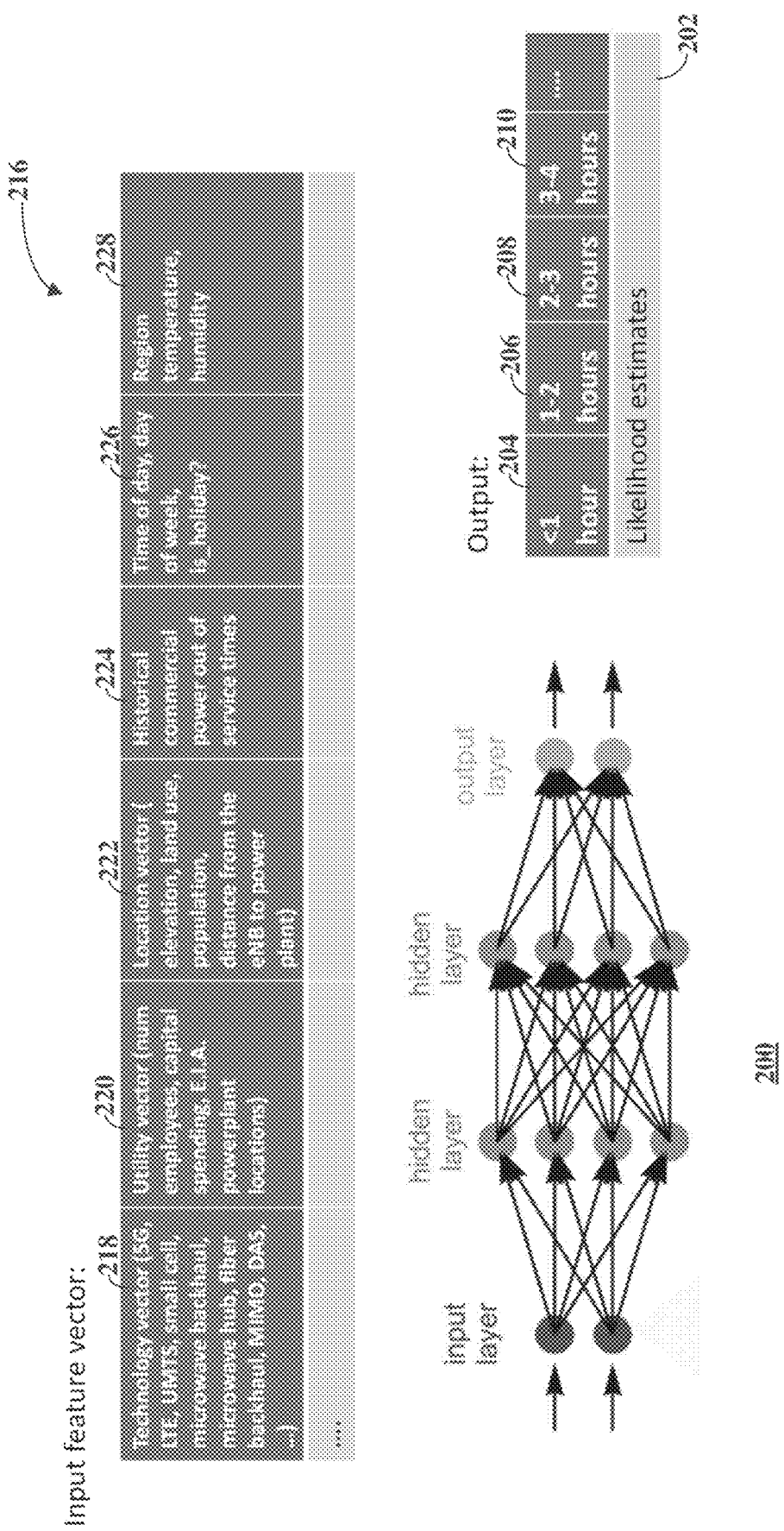
FIG. 2A is a block diagram illustrating an example, non-limiting embodiment of a system functioning within the communication network of FIG. 1 in accordance with various aspects described herein.

The subject disclosure describes, among other things, illustrative embodiments for assisting with a decision to dispatch a portable generator or other emergency equipment to a remote location for a cellular network or similar system. Other embodiments are described in the subject disclosure.

Emergency conditions can affect various types of systems that employ remotely located equipment operating under a central control. One example of a system is a telecommunication system such as a cellular telephone network and one example emergency condition is a power outage to a cellular network component such as a base station. A cellular network operator must make a rapid decision during commercial power outages. The cellular network operator must decide to deploy a portable generator or wait for the commercial power company to repair the problem. This decision is done at the very onset of an outage, where both the operator and commercial power utility have little knowledge of the outage. This lack of knowledge results in inefficiencies, as 40% of generator deployments are not necessary.

Currently, the convention for the cellular network operator is to call the commercial power utility and ask for an estimated time to repair. Additionally, cellular operators are faced with investment decisions to harden a site against future power outages, such as by installing backup batteries or a fixed generator. There often is little knowledge of the reliability of the power to a location, which makes it difficult for the cellular operator to prioritize the investment. These problems are not limited to cellular network operations but affect any system which requires an input resource such as power or water or wind that may be unexpectedly interrupted.

One or more aspects of the subject disclosure include detecting an interruption of a supply of operating power to a cell site of a cellular communication network, estimating an estimated time to restoration (ETR) of the supply of operating power to the cell site, wherein the estimating is based on information of an operator of the cellular communication network, determining, based in part on the ETR, to dispatch a portable generator to the cell site to provide a new supply of operating power to the cell site, and initiating a communication to dispatch the portable generator.

One or more aspects of the subject disclosure include detecting, by an operator of a cellular communication network, a number of cellular devices attaching to a cellular communication network, identifying respective locations of the cellular devices, identifying time of attachment of the cellular devices attaching to the cellular communication network and, based on the number of cellular devices, the respective locations of the cellular devices and the time of attachment of the cellular devices, identifying an interruption of a supply of operating power to a cell site of the cellular communication network. Aspects of the subject disclosure further include estimating an estimated time to restoration (ETR) of the supply of operating power to the cell site based on information about communication technology of the cell site, determining, based in part on the ETR, to dispatch a portable generator to the cell site to provide a new supply of operating power to the cell site, initiating a communication to dispatch the portable generator.

One or more aspects of the subject disclosure include training a machine learning model with training data based on information about communication technology used by a cell site of a cellular communication network and utility company information about an electric power utility which provides a supply of operating power to the cell site, receiving an indication of an interruption of the supply of operating power to the cell site, receiving, by the processing system, from the machine learning model, an estimated time to restoration (ETR) of the supply of operating power to the cell site, and determining a response to the interruption of the supply of operating power to the cell site, wherein the response is determined by a decision engine based in part on the ETR.

Referring now to FIG. 1, a block diagram is shown illustrating an example, non-limiting embodiment of a system 100 in accordance with various aspects described herein. For example, system 100 can facilitate in whole or in part determining a power outage has occurred at a cell site of a cellular communication network using a machine learning model and concluding to dispatch a portable generator to the cell site based on a decision of a decision engine. In particular, a communications network 125 is presented for providing broadband access 110 to a plurality of data terminals 114 via access terminal 112, wireless access 120 to a plurality of mobile devices 124 and vehicle 126 via base station or access point 122, which may be a portion of a cellular network 121, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a machine learning model functioning within a control system of the communication network 125 of FIG. 1 in accordance with various aspects described herein. The control system may be useful for predicting the severity of an interruption of supply of a critical resource to a distributed system. Structure and operation of the system 230 are discussed in conjunction with an exemplary embodiment of a cellular network and prediction severity of commercial power failures to a facility such as a base station or eNodeB of such a cellular communication network. The principles of the solution described herein may be extended to any suitable system which relies on a critical resource.

Embodiments herein relate to predicting the time of restoration of commercial power after a power outage, particularly for a cellular network operator. A cellular network provides voice and data communication to fixed and mobile users in particular geographic regions. An example is the cellular network 121 providing wireless access 120 to a plurality of mobile devices 124 and vehicle 126 via base station or access point 122 in FIG. 1. Each base station or access point 122 in the cellular network 121 provides telecommunication service to mobile device 124 and vehicle 126 in a geographic region served by the base station or access point 122. For mobility, communication with a particular mobile device 124 or vehicle 126 may be handed off from one base station or access point 122 to another as the mobile device 124 or vehicle 126.

Overall control of the cellular network 121 may be managed by one or more network control centers which monitor network activity and provide communications with cellular sites such as the base station or access point 122. Network communications may include, for example, backhaul communications including voice and data communicated between mobile devices 124 and vehicle 126 and network control communications. Such network control communications may include information about device and network status, availability, and key performance indicators. The operator of the cellular network relies on such network control communications when making decisions and taking actions regarding the network. The operator may involve humans and automated processes such as artificial intelligence engines and machine learning tools when making decisions and taking actions.

Each base station or access point 122 in the cellular network 121 is located to provide reliable communications with mobile devices in the geographic area served by the base station or access point 122. Some locations may be in congested urban areas. Other locations may be remote in rural settings. Wherever located, each base station or access point 122 in the cellular network 121 requires a wireline or wireless data connection to other network facilities such as a network control center. Further, each base station or access point 122 in the cellular network 121 requires electrical power to operate radio circuits and data processing equipment.

Typically, the electric power is provided to the site of the base station or access point 122 by an electric utility which generates, transmits, or both, electrical power to the site of the base station or access point 122. The electric power transmission may be part of an electric grid or other service system provided by the utility. Because of weather events and other occurrences, at times, the electric power supply to a cell site such as the base station or access point 122 is interrupted.

In the event of a power interruptions, the base station or access point 122 may become inoperative. If the base station or access point 122 includes supplemental power such as battery backup, solar or wind energy sources, or an uninterruptible power supply, the base station or access point 122 may continue operation with limited or temporary functionality until a repair is completed. In some cases, it may be necessary to dispatch a generator and a human crew to install the generator to return the base station or access point 122 to service. However, the decision to dispatch a portable generator may have a substantial cost. In one example, average cost of a portable generator dispatch is $1300. About 40% of the generator dispatches are wasted, as commercial power is restored prior to the generator and crew arriving on site.

When cell sites lose commercial power, it is important for cell service operators to understand the estimated time of repair from the electrical utility. This estimate is a critical input for operators or any artificial intelligence (AI) decision engine to determine whether and when to dispatch a portable generator and crew to install a portable generator to fully power the cell site after interruption of power supply from the electric utility. Additionally, it can be desirable to provide as input information for the operators or the AI decision a probability distribution of the out-of-service time for the cell site, in addition to an expected value or a maximum likelihood estimator. Still further, operators may opt to harden the site such as by installing a fixed generator at the cell site. The operators would like to determine how best to prioritize the investment such as by performing a what-if analysis.

However, at the time of a power outage, system operators experience a lack of solid information for making decisions. For example, the extent of the commercial power grid, its outages, and efforts by the grid operator are generally not available to customers such as the cellular network operator. In some instances, the commercial power operator will only provide an estimated time to restoration (ETR) of service. Even if the cellular network operator has access to some information about the extent and nature of the outage, the ETR provided by the commercial power operator may be inaccurate and unreliable. Initially, the commercial power operator has limited knowledge, as well, of the nature of the power outage and requirements for repair. An estimate based on limited or unreliable information is necessarily unreliable. Further, restoration of commercial power to a cell site depends to a great degree on the location of the outage and the affected cell site. A cell site experiencing an outage and located remotely, in a rural location, will require more time and effort to access by a crew and portable generator than a cell site in an urban location near other facilities of the cellular network operator.

If the cellular network operator can predict or model the duration of the outage, the cellular network operator can make more informed decisions. On the one hand, the operator can determine if a portable generator dispatch is needed. For example, if information indicates that power will be restored in two hours, but it will take two hours to dispatch a crew and portable generator, sending the crew may not be cost effective. Further, if the operator sees that customers are being impacted, then a trouble ticket should probably be launched, and the generator dispatch process initiated. Thus, embodiments as described herein can improve customer experience and improve operational efficiency.

Conventionally, power outages are handled manually. An alarm may be generated at a base station or cell site when a power outage occurs. For example, the alarm may be battery powered to detect the power outage and generate data or other information which the alarm communicates to a network control center or other destination. In response to receipt of the alarm, network operations personnel work to identify the source of the alarm, the extent of the power outage and an ETR. This includes manually calling power companies to obtain any available information. The personnel then make an informed judgment to decide how to proceed, including whether to dispatch a portable generator and crew.

In accordance with embodiments herein, a high-level regression machine learning (ML) model 200 is built using a neural network to implement supervised learning. Information for the ML model 200 includes historical data such as the duration of past power outages. The ML model 200 may be used to allow a machine to learn relationships within data provided to the machine and make predictions using those relationships. A regression model establishes a relationship between a single dependent variable on several independent variables. In the ML model 200 of FIG. 2A, the dependent variable is the output variable or the duration of past power outages. More specifically, the output on the right-hand side of FIG. 2A is a set of bins or bands of past power output durations 202 including bin 204 holding durations less than one hour, bin 206 holding durations between one and two hours, bin 208 holding durations between two and three hours, bin 210 holding durations between three and four hours, and so on. The bins or bands of past power output durations 202 are likelihood estimates of the noted values.

The ML model 200 receives the input feature vector 216 and identifies transforms to the data of the input vector that will produce an output value from the ML model that will correspond to the expected duration, in hours or minutes, of the power outage. The neural network includes hidden layers that make random transformations to identify a combination of transformations to minimize the predicted error of the expected duration. The neural network operates to fit the right model to the data collected and contained in the input feature vector 216.

On the left-hand side of FIG. 2A, input information to the ML model 200 are illustrated as an input feature vector 216. The input feature vector 216 includes information for predicting a power outage duration or restoration time. The input information may include any suitable information available that may be useful to estimate the time required to resolve a power outage affecting a cell site, a base station, an eNodeB or other component of a cellular telephone network. Other information that may be captured or available may be used as input information to the ML model 200 as well. In the embodiment of FIG. 2A, the input feature vector 216 includes a plurality of vector components including a technology vector 218, a utility vector 220, a location vector 222, a historical vector 224, a temporal vector 226 and an environmental vector 228.

The technology vector 218 includes technology information related to technical features of a cell site or other equipment experiencing a power outage. Examples of such information include the type of radio communication technology or air interface used by the cell site, such as fifth generation (5G) cellular, Long Term Evolution (LTE or 4G)

cellular or Universal Mobile Telecommunications Service (UMTS) cellular. Further examples include information about whether the cell site is a small cell, meaning a cell providing cellular communications service to a relatively small geographic area. Further examples of information about technical features of equipment experiencing a power outage include a type of communication for backhaul data used by the cell site. Examples of backhaul communication include whether the cell site uses microwave communication or fiber communication for backhaul to the network. Further examples include information about whether the cell site uses multiple input, multiple output (MIMO) technology for radio communication. MIMO technology is a method for multiplying capacity of a radio link using multiple transmission and receiving antennas to exploit multipath propagation. A further example of information about technical features of equipment experiencing a power outage includes whether the cell site uses a cellular distributed antenna system (DAS). A DAS is a network of spatially separated antenna nodes connected to a common source via a transport medium that provides wireless service within a geographic area or structure. Other information may be included in the technology vector 218 as well.

The technology information used to populate the technology vector 218 may be obtained from resources of the cellular network provider. For instance, the network provider has information about the type of equipment installed at each cell site, including air interface technology, backhaul technology, and others. The data for the technology vector 218 may originate with any suitable source.

Information about technical features as in the technology vector 218 may be useful for predicting the duration of a power outage or for predicting implications of an extended power outage. For example, if the affected cell site is a small cell, there may be additional cells with overlapping coverage that are available to take the place in the network of the non-functioning small cell. Similarly, if the affected cell site uses 5G cellular technology and here are relatively few customers using 5G for mobile service at the time, the low numbers of affected customers may justify waiting and not immediately sending a crew with a portable generator. Other factors may be used to draw conclusions and make predictions, and other predictions may be made from the same information, based on past experience and other factors.

The utility vector 220 may include utility company information about the electric power utility which provides electric power to the cell site or other equipment subject to a power outage. Examples of such information include the identity of the electric power utility company, the number of employees of that company and the number or relative number of service and maintenance employees of the company. Other examples of such information include information or data about capital spending by the utility company or information about resources devoted to operation and maintenance of utility company assets. Other examples of data include information from the utility company about the current power outage including the estimate of the time to correct the power outage from the utility company itself. Other examples of such information include information from the U.S. Energy Information Agency (EIA) about location and status of power plants of the utility company. Other information may be included in the utility vector 220 as well.

The utility company information used to populate the utility vector 220 may be obtained from any suitable resources. Such resources include information published by the utility company itself, information of government entities such as the U.S. Energy Information Agency, and any other suitable source.

The utility company information used to populate the utility vector 220 may be useful in part for predicting the duration of a power outage or for predicting ability of the utility company to respond to and repair any power outage that may occur. For example, the number of service and maintenance personnel employees may inform a prediction about relative availability of resources to respond to the power outage.

The location vector 222 may include location information about the physical location of the cell site subject to a power outage. Such information may include, for example, geographical information such as map coordinates, a street address and physical elevation of the cell site. Other examples include the nature of the use of the land where the cell site is located, such as residential building, office building or agricultural usage, population or relative population of the area where the cell site is located and a distance of the cell site or eNodeB (eNB) to a power plant which normally provides utility service. In another example, the location information may include location information for multiple cell sites if the power outage is widespread, across a region. Other information may be included in the location vector 222 as well.

The location information used to populate the location vector 222 may be obtained from any suitable resources. Some information may originate with the cellular network provider itself, such as the address or map coordinates of the cell site. Other information may originate from other sources such as the utility company and government sources.

The location information used to populate the location vector 222 may be useful in part for predicting the ability of the utility company to respond to and repair any power outage that may occur. For example, if the location is physically remote from other areas, a repair crew may be delayed in accessing the locations.

The historical vector 224 may include historical information about past occurrences of power outages. The historical information may be collected and organized in any suitable fashion, such as past power outages at the particular cell site, or past power outages experienced with the particular utility company. Other information may include the amount of time required to complete a repair of a power outage, as well as any other suitable information.

The historical information used to populate the historical vector 224 may be obtained from any suitable resources. Such resources include records and other information of the cellular network provider and publicly available information of the utility company.

The location information used to populate the location vector 222 may be useful in part for predicting the ability of the utility company to respond to and repair any power outage that may occur. For example, if the particular cell site or the particular utility has a history of long-duration power outages, that information may inform a decision to send a crew with a portable generator rather than to wait for the utility company to effect a repair.

The temporal vector 226 may include information about timing of past power outages and timing of a current power outage. The temporal information may be collected and organized in any suitable fashion, such as according to calendar date, day of the week, and with an indication of whether the date of a past power outage was a holiday or is associated with some other significant event. Such information may be used to predict a future power outage or the time required to resolve a current power outage. For example, if a previous power outage occurred on a federal holiday and response time by the utility company was delayed because of lower than normal holiday staffing, and the current day is a federal holiday, the conclusion to send a crew with a portable generator may be justified. The temporal information may be obtained from any suitable source such as the records of the cellular network provider.

The environmental vector 228 may include information about the environment during past power outages and at a current time. The environmental information may be collected and organized in any suitable fashion, such as by date or using keywords such as heat and humidity or subzero. The environmental information may be used to predict a future power outage or the time required to resolve a current power outage. For example, if a previous power outage occurred when ambient temperatures were above 100 degrees Fahrenheit for five days straight and current temperatures correlate with that history the time to respond to the previous power outage may also correlate with a current response time by the utility company. Such information may be used to decide to dispatch a crew with a portable generator.

The input feature vector 216 may include any other suitable information. In an example, the input feature vector 216 may include key performance indicator (KPI) data for the cellular network or for the cell site or other equipment subject to the power outage. KPI data may be any technical data that characterizes performance and reliability of the cellular network or components such as a base station or eNodeB of the cellular network. An example is the number of customers accessing the base station currently or at a time in the past or over a time period. Further the input feature vector 216 may include alarm data, such as start time and end time for various alarms that may be triggered and reported to a network control center.

The output from the ML model 200 is an estimate of the duration of the power outage to a cell site or other equipment. Generally, the output 202 from the ML model is a numerical estimate of the duration of the outage. The numerical estimate may be used to inform decisions, such as a decision to send a portable generator to power the cell site until power can be restored by the utility company. The numerical estimate may be combined with other information to inform similar decisions. In one example, the output from the ML model 200 is in the form of a distribution. Instead, or in addition to, predicting a number corresponding to the duration of the power outage, the ML model 200 can produce a prediction of parameters a distribution. This include an indication of how accurate the prediction is believed to be. This may form a quality measure, indicating a quality or reliability of the prediction produced by the ML model 200.

The ML model 200 in some embodiments generally in real time. That is, the model receives data of the input feature vector 216 on an on-going basis as the cellular communication network operates. The ML model 200 may be updated on a frequent or periodic time frame, such as every 5 to 15 minutes. In this manner, the ML model 200 will produce a near real time prediction of duration of a power outage within a very short amount of time after the power outage first occurs or is reported by providing an alarm to a network control center. As the outage occurs, multiple predictions will be made by the ML model 200.

Figure 2B:
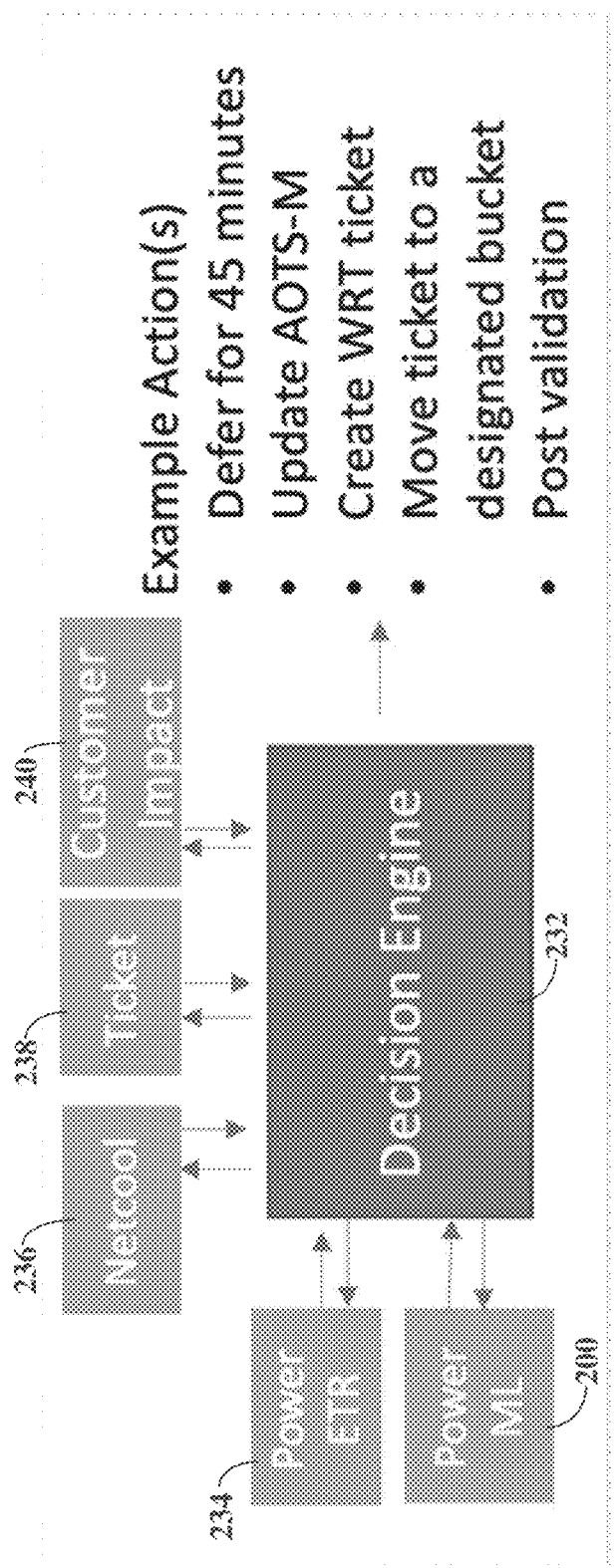
FIG. 2B is a block diagram illustrating an example, non-limiting embodiment of a system for responding to a commercial power failure and functioning within the communication network of FIG. 1.

FIG. 2B is a block diagram illustrating an example, non-limiting embodiment of a system 230 for responding to a commercial power failure and functioning within the communication network 125 of FIG. 1 in accordance with various aspects described herein. The system 230 may be useful for responding to an interruption of supply of a critical resource to a distributed system. Structure and operation of the system 230 are discussed herein in conjunction with an exemplary embodiment of a cellular communication network and response to a commercial power failure to a facility such as a base station or eNodeB of such a cellular communication network. The principles of the solution described herein may be extended to any suitable system which relies on a critical resource.

The system 230 includes a decision engine 232 which receives as inputs information from a power machine learning (ML) model 200, a utility estimated time to restoration (ETR) of service 234, an alarm database 236, a ticket database 238 and information about customer impact 240. Combining these inputs in the decision engine enables the cellular network provider to make a more holistic decision about how to respond to a service interruption in power supply or essential item.

The utility ETR 234 may include information received from one or more utility companies or resource suppliers regarding an estimated time to restoration of service after an interruption in service. Some utility companies are developing models to help estimate response time to interruptions in service. Other utility companies provide a rough prediction of when an interruption will be corrected.

The alarm database 236 collects and makes available information about alarms generated by equipment of the cellular communications network. An alarm may be any automatically generated indication of an event or status of a component of the cellular communications network. The alarm may include one or more data messages communicated over a network and stored in the alarm database 236 for further attention. In a particular example, when a cell site, base station or eNodeB loses power supply, an alarm is generated by the equipment, for example running under battery power. The alarm includes information specifying the equipment or component which generated the alarm, the date and time the alarm was generated and any pertinent information to be reported in the alarm. Any sort of information may be reported in an alarm message for response and further attention. Information about alarms is reported to the decision engine 232. In particular embodiments, information about interruptions in power supply to a cell site is reported from the alarm database 236 to the decision engine 232.

The ticket database 238 stores information about trouble tickets generated in the cellular communications network. Trouble tickets represent items that need attention to ensure reliable operation of components in the network. Trouble tickets may be embodied as data files or data messages. Trouble tickets may include any suitable information such as identification information for the component or item in the network that needs attention or rectification, a time stamp, and an indication of the nature of the problem. Some trouble tickets may be originated based on received alarms in the alarm database 236. Some trouble tickets may be originated based on human action to identify a problem. Some trouble tickets may be originated based on customer feedback. For example, customer feedback may include a call from a customer identifying a service interruption.

The information about customer impact 240 may include a quantified estimate of the extent to which a cell site outage affects customers of a cellular network provider. For example, cellular service to a particular geographic region may be provided by more than a single cell site. Cell sites are positioned and coverage areas are defined to ensure overlap, for mobility handoff and other reasons. Therefore, during outage of a single cell or sector, a network control center may modify cell coverage areas temporarily so that adjacent base stations or eNodeB devices will provide coverage to the affected area. Service may not be ideal and there may be a brief interruption but service will continue to be available to customers. The interruption may be invisible to the customer. In that situation, there is no particular urgency from the customer's perspective to return the disabled cell site to service. The information about customer impact 240 reflects factors about the impact on the customers of the service. The information received by the decision engine 232 may include or be based on information about the number of customers affected by the power outage, the amount of traffic currently being handled by the cell and the amount of traffic expected during the estimated duration of the outage. The amount of expected traffic may be based on past history for the particular base station or for similar base stations.

The decision engine 232 identifies a power outage at a particular cell site based on inputs from the alarm database 236 and the ticket database 238. The decision engine 232 thereupon analyzes information pertinent to the reported power outage and makes decisions regarding how to respond to the power outage. A first exemplary response is to dispatch a crew and portable generator to provide temporary power to the particular cell site for a time until the utility company can restore power. A second exemplary response is to take no immediate action, continue to monitor the situation, wait for the utility company to restore power.

For example, the decision engine 232 will receive an alarm from the alarm database 236 and will consider the information contained in the alarm. If the alarm is reporting an interruption in power service, the decision engine 232 will consider the location of the reported power outage. The decision engine 232 will consider if the location of the reported power outage is a priority location. A priority location is a location of a cell site which affects a critical facility that requires reliable, uninterrupted communication services. An example of a critical facility is a hospital. If the decision engine 232 receives alarms for two cell sites and the first serves a high priority location such as a hospital and the second does not serve a high priority location, the decision engine will likely choose to dispatch a portable generator to the cell site that serves the high priority location. Other factors and inputs received from other sources such as the power ML model 200, the power ETR 234, the ticket database 238 and the information about customer impact 240 may produce a different result.

The decision engine 232 can use any suitable process to select between possible courses of action. Some of the inputs to the decision engine 232 may be weighted. For example, in some circumstances, information about customer impact 240 may be weighted more heavily than the estimate of the duration of the power outage received from the power ML model 200. As an example, even though the estimate of the duration of the power outage suggests that the outage will last a relatively long time so that a generator should be immediately dispatched, the information about customer impact 240 might suggest that customer impact is so low that the dispatch of a generator is not warranted. This might be the case, for example, in a lightly used cell site or in a cell site for which overlapping coverage for cellular service is readily available so that few customers see any significant impact from the power outage.

As illustrated in FIG. 2B, the decision engine 232 can select among several possible actions based on the inputs to the decision engine 232. In a first possible action, the decision engine 232 can conclude that, in response to a reported or detected power outage, a portable power generator should be dispatched to a cell site or other network location affected by the power outage. If multiple cell sites or network locations are affected by the power outage, multiple power generators may be dispatched.

A power generator may be dispatched in any suitable manner. In one example, a communication in the form of a dispatch request is sent over a data network of the cellular network provider based on the output of the decision engine 232. The communication may identify the cell site or other location affected by the power outage, a timing at which the generator should be dispatched, and any other information needed to prepare a response. The communication may be sent to personnel of the network operator responsible for providing the power generator. The communication may be sent to a contractor or affiliated organization responsible for providing the service to the network operator. In response, one or more crews of human personnel, along with generating equipment and other necessary equipment, may be sent to the site needing restoration of power. Other necessary equipment might include a lift bucket to hoist personnel into position to perform necessary work or cable for electrical connections. In another example, the decision engine 232 alerts a human operator who makes a call to the generator crew.

In the exemplary embodiment, a portable generator provides power to a cell site or other network equipment of a cellular communications network affected by a commercial power outage. However, other types of systems also require other essential resources and embodiments and features described herein in connection with electrical power supply to a cellular base station. Other exemplary resources include a supply of fresh water, supply of septic service to remove wastewater and supply of communication services to a site. Any system for supplying these or other resources may benefit from the advantages provided in accordance systems and method described herein.

As illustrated in FIG. 2B, other possible actions selectable by the decision engine 232 based on the inputs to the decision engine 232 include deferring any response for an amount of time. In the illustrated example, further action is deferred by 45 minutes. In other embodiments, any suitable amount of time may be selected to defer action, and the amount of time may be programmable or selectable based on other received information. An action, such as dispatching a portable generator to an inoperable cell site, may be deferred for any suitable reason, such as to collect additional information, to await availability of equipment and crew or to await improved conditions, such as better weather.

Other possible actions selectable by the decision engine 232 based on the inputs to the decision engine 232 include updating a ticketing system. The ticketing system in the illustrated embodiment may be referred to as AOTS-M and may include various features for initiating trouble tickets, tracking trouble tickets and responding to and clearing or closing trouble tickets. A trouble ticket is an electronic record identifying an asset that needs attention of some sort. The electronic record may be shared among responsible parties to ensure that necessary actions are taken and accounted for. In the context of a cell site or other equipment experiencing a power outage, the occurrence of the power outage and receipt of an alarm at the network control center may initiate a ticket which is associated with the power outage. A decision made by the decision engine 232 to dispatch a generator or defer action or any other action may be reported to the ticketing system to update the ticket associated with the power outage.

Other possible actions selectable by the decision engine 232 based on the inputs to the decision engine 232 include creating a vendor (WRT) ticket. The operator of the cellular communications network in some embodiments engages one or more vendors to provide products and services. An example of a vendor is a company that provides portable generators and human crews to install and operate such portable generators. In some instances, it is possible or preferable to request a vendor provide the portable generator or other required resource in response to the power outage or other condition. The decision engine 232 may conclude that engaging a vendor is the best choice based on the inputs to the decision engine.

Other possible actions selectable by the decision engine 232 based on the inputs to the decision engine 232 include moving a ticket to a designated bucket or category for work. For example, one bucket may be designated to hold all external power alarm tickets and another bucket may be designated to hold tickets related to generator or electrical equipment repairs. The bucket identification may be a designator for a database entry corresponding to the ticket or any other suitable identification.

Other possible actions selectable by the decision engine 232 based on the inputs to the decision engine 232 include a post validation process to confirm that work was completed properly, such as when work is performed by a vendor at request or direction of the operator of the cellular network. Post validation may also include an analysis of the success or failure of attempts to correct the power outage and a conclusion of whether correct steps were taken in handling the power outage.

The information about estimated time to restoration (ETR) of service 234 may be received from the utility company that provides electric power to the affected site. Some utilities are developing models or collecting data to try to estimate, for their own purposes, information such as the amount of time required to return reliable service after a service outage.

As illustrated in FIG. 2B, in some embodiments, the output of the ML model 200 may be combined with other information from other sources to develop predictions or estimates about multiple sites affected by the power outage. Other information combined with the output of the ML model includes, for example, the amount of time required to dispatch a portable generator from its current location to the site of the affected cell site or a measure of customer impact. Customer impact may be measured by any suitable metric such as the number of customers affected by the power outage or the presence of a high priority location served by the affected cell site. A high priority location includes a hospital, police or fire facilities where maintaining reliable, uninterrupted communications ability is very important.

In an example, the ML model 200 may develop information or a recommendation to send a portable generator to a first cell site versus a second cell site because the outage duration time would be shorter at the first cell site. Additional information from the ML model may include an indication that the first cell site is more apt to recover sooner than the second site or more apt to experience a power outage than the second site or does the first site have a higher priority than the second site.

In an example, an automated system enables moving and reassigning of trouble tickets. In a manual process, the system determines a status of a received ticket and assigns the ticket to a bucket or a categorization for handling. The received ticket may be in the form of a data file and the bucket may be a field that is written to the data file or a status that is assigned to the data file. The system moves tickets in a manual process. When a ticket is received, it is assigned to a bucket based on status information of the ticket. After a set amount of time, if an alarm is present, the ticket can be moved onward or closed out. When a new ticket is received and is accompanied by the estimate of duration of power outage from the power ML model 200, a response to new ticket may be based in part based on the estimate of duration of power outage. For example, the decision engine may conclude that, based on the estimate of duration of power outage and past historical information, the new ticket may be deferred for attention in favor of other trouble tickets. Conversely, based on the identify of the affected cell site and the estimate of duration of power outage, the decision engine may conclude that a portable generator should be immediately dispatched to the site to return service to that particular cell site.

In accordance with industry practices, it is believed that the size of a commercial power outage in terms of the number of homes affected or the number of streets that are affected by the power outage, is the primary predictor as to the length of time required for restoration of power. For many customers of cellular service, when they are in a static location such as home or work, the customer's cellular phone connects to a local Wi-Fi network for internet access and even internet telephone service. The Wi-Fi service is provided by a local Wi-Fi router attached to a cable modem or digital subscriber line (DSL) modem or other network connection. However, when commercial power is interrupted, the Wi-Fi router is no longer operational, so the customer's cellular phone instead automatically connects to the cellular network and become active on the cellular network. From the perspective of the cellular network provider, the provider can detect the phones connecting to the cellular network at the time commercial power is lost. Thus, when a single residential street loses commercial power, a relatively small number of phones will attach to the cellular network at about the same time. If a larger area is affected by the power outage, more customers' Wi-Fi access will be affected and their phones will connect to the cellular network. Thus, the number and timing and location of cellular phones connecting to the cellular network can provide an indication of the scope of the commercial power outage. Such information may be added as an input to the ML model 200 in the input feature vector 216.

Further, the conclusion by the cellular network operator that a power outage has occurred in a particular region may be shared with other entities. For example, the cellular network operator is typically in communication with the power utility and may advise the utility of the outage. The utility may use the information from the cellular network provider to identify or locate a particular outage, such as at a particular utility pole, at a granularity or local level that the power utility may not otherwise possess. The cellular network operator may further share the information about the power outage with organizations such as municipalities and local government as well as first responders such as police and firefighting organizations who may rely on the information.

Figure 2C:
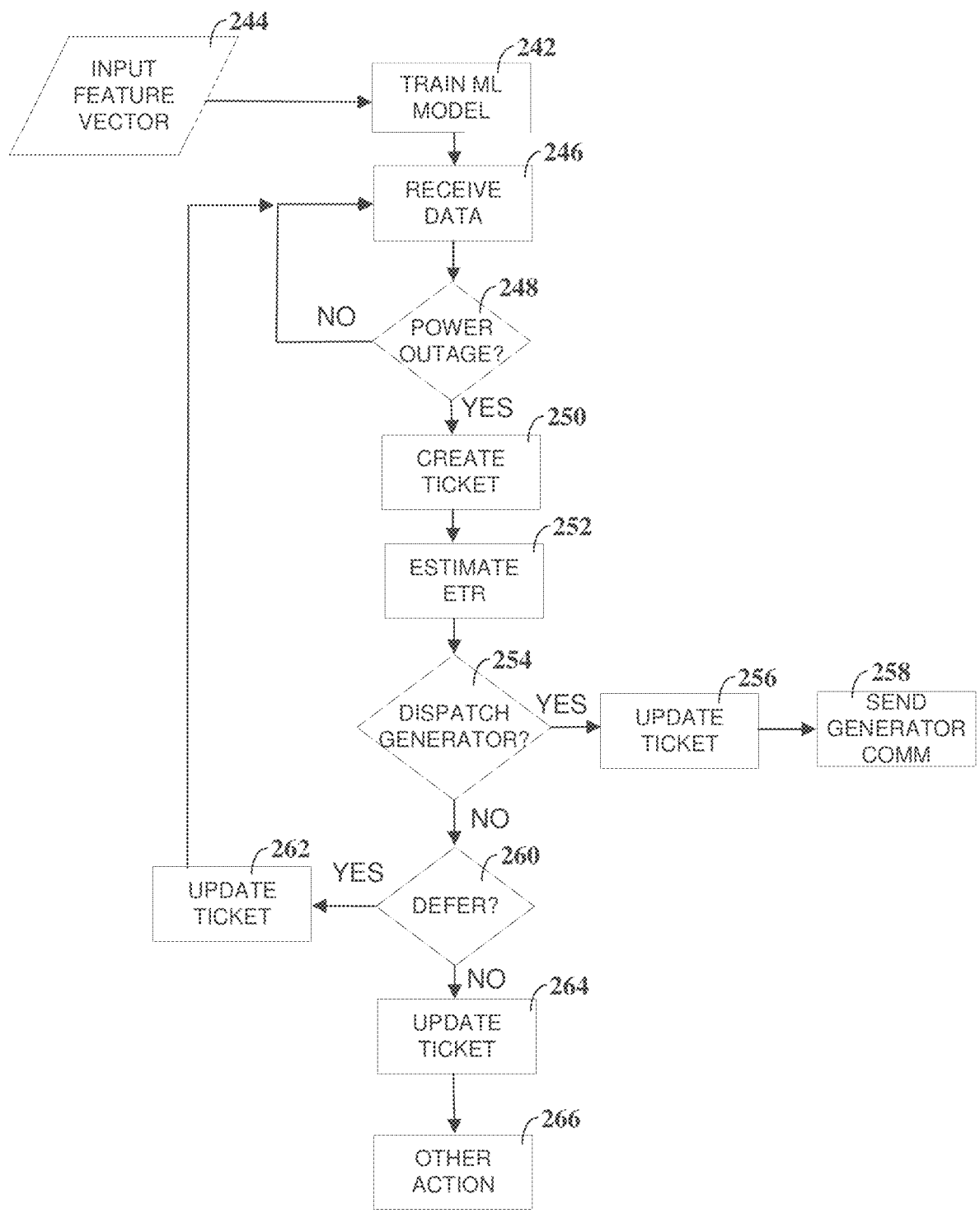
FIG. 2C depicts an illustrative embodiment of a method in accordance with various aspects described herein.

FIG. 2C depicts an illustrative embodiment of a method 240 in accordance with various aspects described herein. The method 240 may be useful for identifying and responding to an interruption of supply of a critical resource to a distributed system. In the exemplary embodiment, the method 240 is useful for identifying and responding to an electrical power outage in a component of a cellular communications system. The method may be implemented by any suitable equipment. In one example, the method is implemented by data processing equipment and communications equipment of a cellular network communications center which is in data communication with various components of the cellular communications network.

At block 242, the method 240 begins with training a machine learning model. Any suitable ML model may be used. In an exemplary embodiment, a neural network is trained with historical, technical and operational data of an input feature vector 244. The embodiment of the input feature vector 216 (FIG. 2A), including some or all data used in that example or additional data may be used to train the ML model.

After the model is trained, a system may be initiated to monitor conditions in the cellular communications system. For example, devices and network equipment of the cellular communications system may from time-to-time report status information. Further, one or more alarms may be reported from the equipment of the cellular communications system to a network control center or other facility of the cellular communications network. The alarms may include data and other information to prompt a response from the network control center.

At block 246, data is received including status information for a component of the cellular communications network. In one example, the received data is in the form of an alarm about a condition of the component. The alarm may be generated and communicated in response to a detected condition, such as a power outage at a cellular base station or eNodeB. Alternatively, the data may be reported back to the network control center in response to a query from the network control center to the base station or other equipment.

In another example, the method 240 monitors cellular devices attaching to the cellular communications network including the time of attachment and location of attachment. Attaching to the network may include any suitable operations such as communicating with a base station or eNode B by the cellular device, registering with the base station and beginning a voice or data session with the base station or eNodeB. The method 240 may include noting the time and location of attachment of cellular devices.

At block 248, the method 240 determines, based on the received data, if there is a power outage. In one example, an alarm received from the cellular base station may specifically identify that a power outage has occurred. If the method 240 concludes at block 248 that no power outage has occurred, control returns to block 246 to receive additional data and monitor for a power outage.

In another example, the method 240 may determine that a power outage has occurred based on the time and location of attachment of cellular devices to the cellular network. The method 240 may detect characteristics of the interruption in supply of operating power to the cell site or to an area served by the cell site. For example, if a number of cellular devices attach to the network within a geographic area, the method 240 may assume that a power outage has occurred in the geographic area. The number of cellular devices attaching to the network may indicate that power to WiFi routers and other network equipment has been interrupted and cellular devices that were previously communicating over a local WiFi network are switching to communicating over the cellular network. Generally, communication over a local WiFi network is favored because charges may be less and battery consumption of a battery powered cellular device may be less than when communicating with a remote cellular network. The method at 248 may compare the number of devices attaching to the cellular network to a predetermined threshold to determine if the number suggests a power outage. Similar, the time frame over which the cellular devices attach to the cellular network may be compared with a threshold, such as 5 minutes or 30 minutes. Still further, the area within which the cellular devices are located may be determined in any suitable fashion to determine if a power outage has occurred. In one example, if more than 10 cellular devices attach to the cellular network within 5 minutes within 1 mile of a specified base station of the network, the method 240 may conclude that a power outage has occurred in that area.

If a power outage is determined to occur, at block 250 a trouble ticket or ticket is created. The trouble ticket in one example is an entry in a database. The entry includes characteristics of the interruption in power supply such as information necessary to identify events or incidents including the power outage. Such information may include, for example, information about the nature of the incident identifying that a power outage has occurred, information identifying a location of the power outage, a time and date stamp, and any other information that may be useful for tracking progress toward resolution of the power outage. The entry in the database may be accessed by other individuals and equipment involved in rectification of the ticket including managers and contractors or vendor personnel.

At block 252, the method generates an estimated time to restoration of power to the affected network device. In an embodiment, a ML model is used to predict or estimate the duration of the power outage. The ML model may be an embodiment of the ML model of FIGS. 2A and 2B and use various historical, technical and location information, as well as other information, to develop an estimate of the time to restore power. The estimate may have any suitable form such as a number of hours or minutes estimated to be required to return power to the affected equipment. In some embodiments, the estimate may have the form of a distribution of possible ETR values along with a confidence in each possible ETR value.

The estimated ETR from block 252 may be used at block 254 to determine whether to dispatch a portable generator to return power to the affected equipment. Other information that is currently available or that has been collected may be used to determine a course of action. In accordance with embodiments discussed in connection with FIG. 2B, a decision engine such as decision engine 232 may be used to select a possible course of action to respond to the outage. Any other logic or algorithm or process may be used to select response.

If it is decided to dispatch a generator to address the power outage, at block 256 the ticket is updated. Updating the ticket may include, for example, noting that a generator is to be dispatched, noting the time and date and identifying responsible personnel, such as a contractor or vendor, in the ticket. Control proceeds to block 258 where a communication is sent to dispatch the generator to resolve the power outage.

If it is decided not to dispatch a generator at block 254, at block 260, it is determined if the decision should be deferred. For example, the method may choose to defer a decision pending receipt of additional information such as information about how widespread a power outage may be, how many cellular base stations are affected, and relative priorities of affected base stations. Such information may be used to inform decisions about how to proceed.

If the decision is made at block 260 to defer the decision, the ticket is updated at block 262 and control returns to block 246 to await additional data. Similarly, if the decision is made not to defer a response to the power outage, at block 264 the ticket is updated and at block 266, another action is taken. Any suitable action may be taken to address the power outage.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in determining a power outage has occurred at a cell site of a cellular communication network using a machine learning model and concluding to dispatch a portable generator to the cell site based on a decision of a decision engine.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
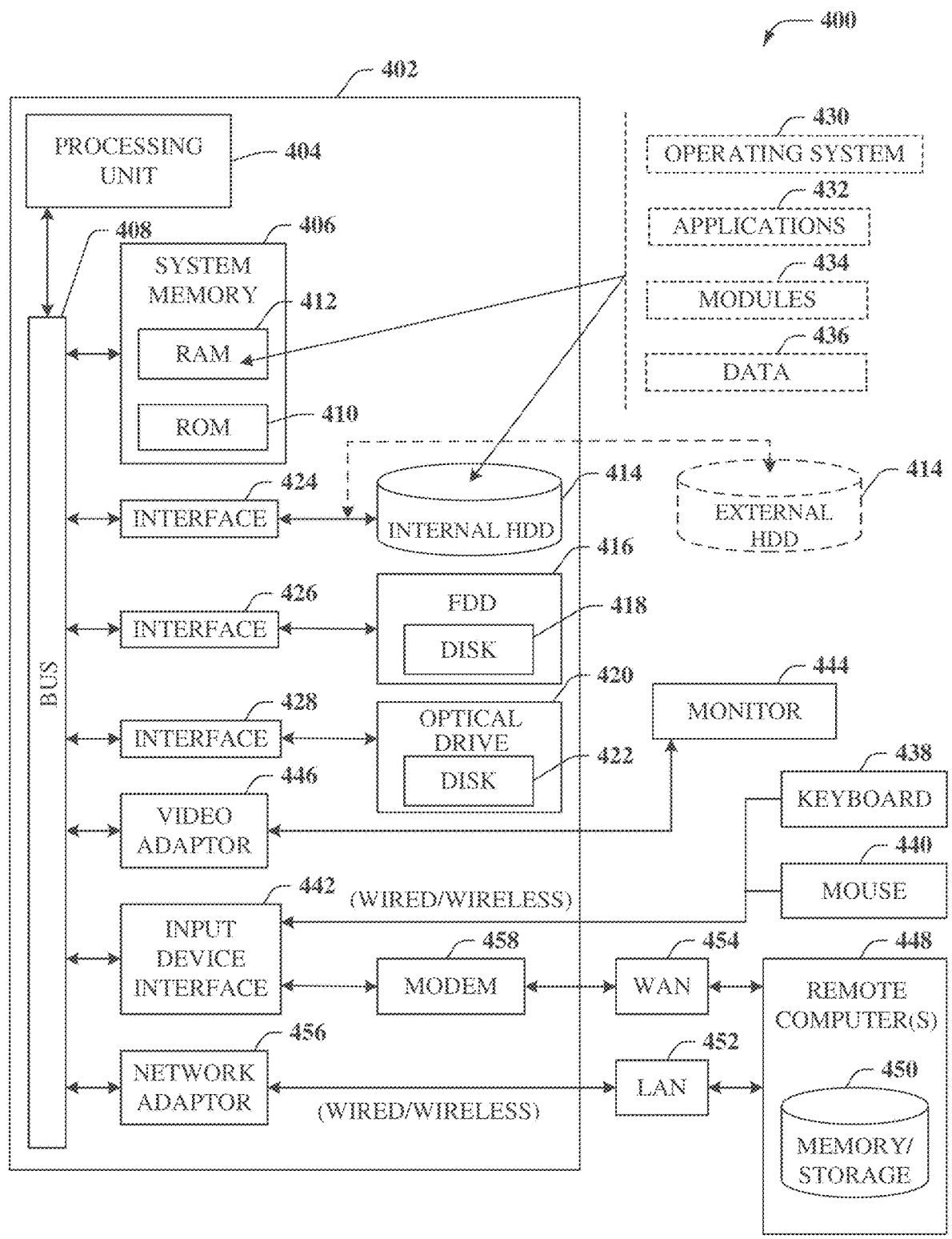
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a power outage has occurred at a cell site of a cellular communication network using a machine learning model and concluding to dispatch a portable generator to the cell site based on a decision of a decision engine.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
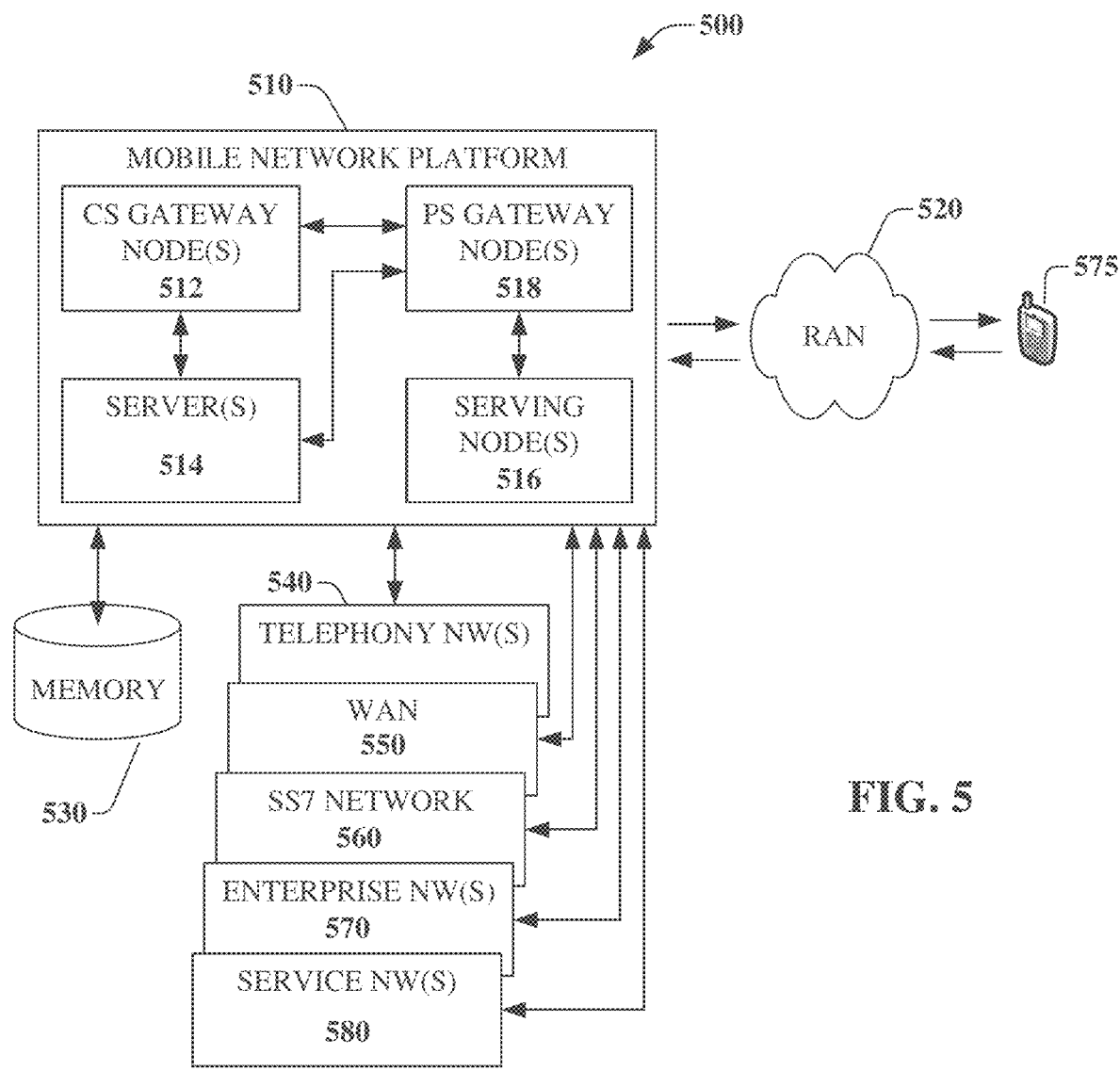
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a power outage has occurred at a cell site of a cellular communication network using a machine learning model and concluding to dispatch a portable generator to the cell site based on a decision of a decision engine. For example, the cell site may be embodied in whole or part in accordance with the mobile network platform 510. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
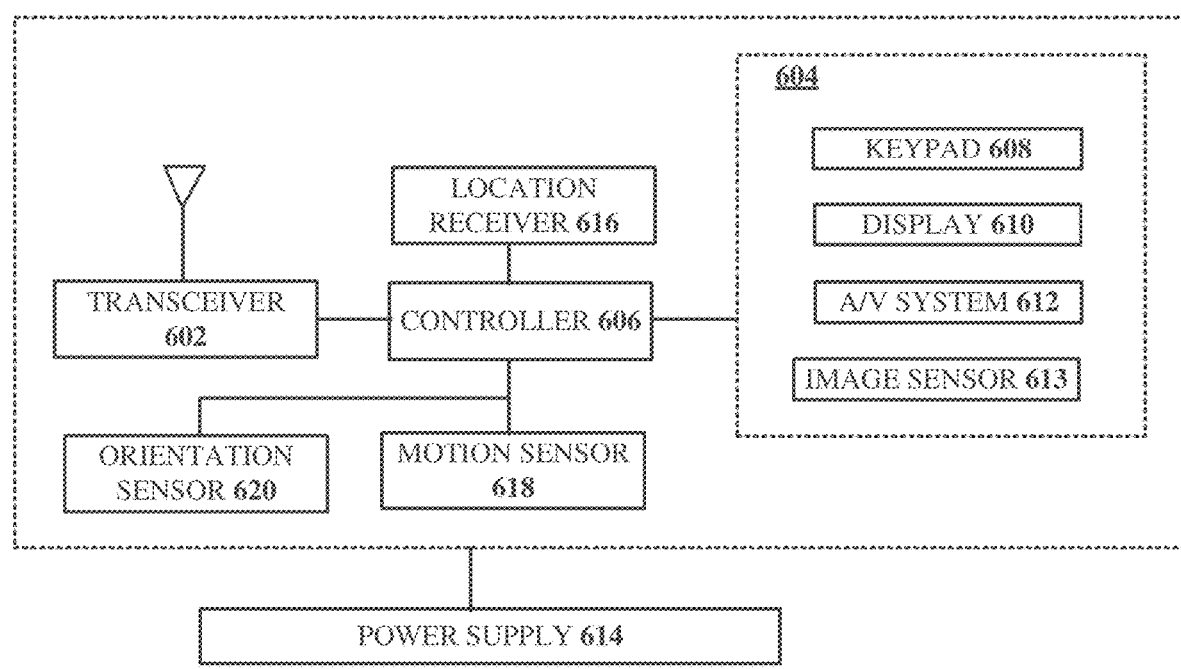
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining a power outage has occurred at a cell site of a cellular communication network using a machine learning model and concluding to dispatch a portable generator to the cell site based on a decision of a decision engine.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
a processing system including a processor; and
   a memory that stores executable instructions that, when executed by the processing system, facilitate performance of operations, the operations comprising:

detecting an interruption of a supply of operating power to a cell site of a cellular communication network;

estimating an estimated time to restoration (ETR) of the supply of operating power to the cell site, wherein the estimating is based on information of an operator of the cellular communication network;

determining, based in part on the ETR, to dispatch a portable generator to the cell site to provide a new supply of operating power to the cell site; and initiating a communication to dispatch the portable generator.

2. The device of claim 1, wherein the operations further comprise:

determining, by an operator of the cellular communication network, a number of cellular devices attaching to a cellular communication network;

detecting the interruption in supply of operating power to the cell site; and detecting size, scope and severity of the interruption in supply of operating power based on the number of cellular devices attaching to the cellular communication network exceeding a threshold.

3. The device of claim 2, wherein the operations further comprise:

identifying a location of the cell site based on location of the cellular devices attaching to the cellular communication network.

4. The device of claim 2, wherein the operations further comprise:

determining respective attachment times for the cellular devices attaching to the cellular communication network;

determining respective locations of the cellular devices attaching to the cellular communication network; and detecting characteristics of the interruption in supply of operating power to the cell site based on the respective attachment times and the respective locations of the cellular devices.

5. The device of claim 1, wherein the operations further comprise:

receiving technology information about technical features of the cell site, the technology information including at least information about a type of radio communication technology used by the cell site; and estimating the ETR based on the technology information.

6. The device of claim 5, wherein the operations further comprise:

receiving location information about a physical location of the cell site, the location information including at least a street address of the cell site and a physical elevation of the cell site; and estimating the ETR based on the location information.

7. The device of claim 6, wherein the operations further comprise:

receiving utility company information about an electric power utility which provides the supply of operating power to the cell site, the utility company information including at least an identity of the electric power utility and information about a relative number of service and maintenance employees of the electric power utility; and estimating the ETR based on the utility company information.

8. The device of claim 1, wherein the operations further comprise:

receiving, from an electric power utility which provides the supply of operating power to the cell site, a power provider estimated time to restoration; and determining to dispatch a portable generator to the cell site based in part on the power provider estimated time to restoration.

9. The device of claim 1, wherein the operations further comprise:

receiving an alarm from the cell site; and detecting the interruption in supply of operating power to the cell site based on the alarm.

10. The device of claim 1, wherein the operations further comprise:

receiving a quantified estimate of customer impact of the interruption in supply of operating power to the cell site; and determining to dispatch a portable generator to the cell site based in part on the quantified estimate of customer impact.

11. The device of claim 1, wherein the initiating a communication to dispatch the portable generator comprises:

communicating a dispatch request, the dispatch request comprising an identification of the cell site affected by the interruption of supply of operating power and a timing at which the portable generator should be dispatched.

12. A non-transitory machine-readable medium, comprising executable instructions that, when executed by a processing system including a processor, facilitate performance of operations, the operations comprising:

detecting, by an operator of a cellular communication network, a number of cellular devices attaching to a cellular communication network;

identifying respective locations of the cellular devices;

identifying time of attachment of the cellular devices attaching to the cellular communication network;

based on the number of cellular devices, the respective locations of the cellular devices and the time of attachment of the cellular devices, identifying an interruption of a supply of operating power to a cell site of the cellular communication network;

estimating an estimated time to restoration (ETR) of the supply of operating power to the cell site, wherein the estimating is based on information about communication technology of the cell site;

determining, based in part on the ETR, to dispatch a portable generator to the cell site to provide a new supply of operating power to the cell site; and initiating a communication to dispatch the portable generator.

13. The non-transitory machine-readable medium of claim 12, wherein the estimating the ETR comprises:

estimating the ETR in a machine learning model; and providing the ETR to a decision engine, wherein the decision engine is configured to determine to dispatch the portable generator.

14. The non-transitory machine-readable medium of claim 13, wherein the operations further comprise:

training a neural network as the machine learning model, wherein the training comprises providing to the neural network one or more of technology information, utility company information and location information.

15. The non-transitory machine-readable medium of claim 13, wherein the operations further comprise:

determining, by the decision engine, to defer dispatching the portable generator to the cell site for predetermined time.

16. The non-transitory machine-readable medium of claim 13, wherein the operations further comprise:
generating a trouble ticket, wherein the generating is in response to the identifying an interruption of a supply of operating power to a cell site; and
updating the trouble ticket based on a decision of the decision engine.

17. The non-transitory machine-readable medium of claim 12, wherein the operations further comprise:
determining a type of radio communication technology used by the cell site;
determining a type of backhaul communication for backhaul data used by the cell site; and
estimating the ETR based on the type of radio communication technology or the type of backhaul communication for backhaul data, or both.

18. A method, comprising:
training, by a processing system including a processor, a machine learning model with training data, the training data based on information about communication technology used by a cell site of a cellular communication network and utility company information about an electric power utility which provides a supply of operating power to the cell site;
receiving, by the processing system, an indication of an interruption of the supply of operating power to the cell site;
receiving, by the processing system, from the machine learning model, an estimated time to restoration (ETR) of the supply of operating power to the cell site; and
determining, by the processing system, a response to the interruption of the supply of operating power to the cell site, wherein the response is determined by a decision engine based in part on the ETR.

19. The method of claim 18, comprising:
determining, by the processing system, to dispatch a portable generator to the cell site to provide a new supply of operating power to the cell site.

20. The method of claim 18, comprising:
identifying, by the processing system, a group of cellular devices attaching to the cellular communication network;
determining, by the processing system, location information for the group of cellular devices; and
based on the identifying and the location information, producing the indication of an interruption of the supply of operating power to the cell site.

* * * * *